Oct. 16, 1934.  H. C. DAVIS  1,977,175

PIPE FITTING

Filed July 18, 1933

INVENTOR.
Howard C. Davis.
BY
ATTORNEY.

Patented Oct. 16, 1934

1,977,175

UNITED STATES PATENT OFFICE 1,977,175

PIPE FITTING

Howard C. Davis, Elizabeth, N. J.

Application July 18, 1933, Serial No. 680,913

3 Claims. (Cl. 285—203)

My invention relates to a fitting for connecting two pipe ends together and in particular to a fitting which may be readily bent to join pipe ends which are slightly offset.

In many instances in installations requiring a pipe line, the pipe connections of stationary fixtures are out of alignment with the built-in pipe connections therefor. Frequently, this condition is such that it is impossible to properly connect the fixture without using additional pipe fittings or straining the pipe connections, and it is a purpose of my invention to provide a pipe fitting that can be readily bent to connect such pipe connections which are out of alignment without straining or injuring the pipe line.

In accordance with my invention I provide a flexible pipe fitting which consists of a tubular member having a section intermediate the ends thereof with a wall that is thinner than the end sections. The thin-walled intermediate section of the fitting is readily bent to form an angle fitting suitable for connecting offset sections of a pipe line for example. The wall of the thin section of the fitting is supported against collapsing radially when the fitting is bent by reinforcement which supports the wall.

Specifically, one form which the fitting may take is that of a nipple having the end sections thereof threaded to receive a coupling. Intermediate these threaded end sections, the wall of the nipple is grooved at spaced intervals to form a section having a thin wall which may be readily bent. The integral rings formed between the spaced grooves serve as reinforcing rings for the thin-walled intermediate section and support this section of the fitting against collapsing radially when the fitting is bent.

Such a nipple is illustrated in the accompanying drawing and described in detail below from which illustration and description a clearer understanding of the invention may be had.

Figure 1:
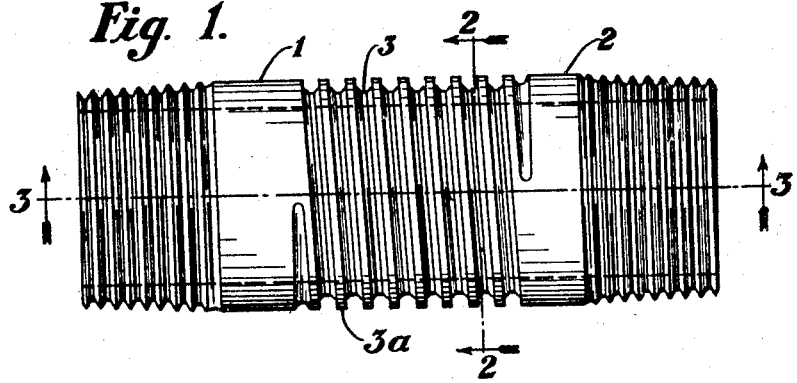
Fig. 1 is a side elevation of a nipple constructed in accordance with my invention.
Figure 2:
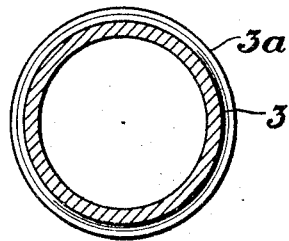
Fig. 2 is a sectional, end elevation taken on the line 2—2 of Fig. 1.
Figure 3:
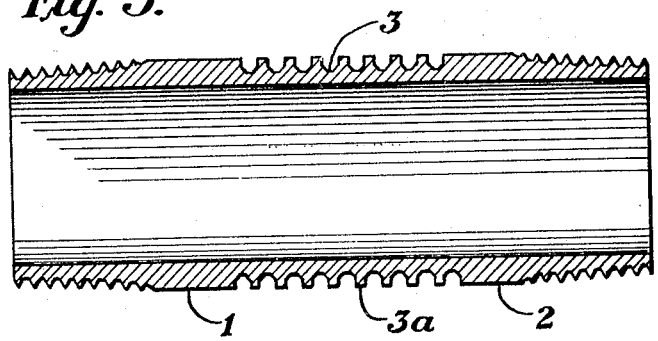
Fig. 3 is a longitudinal, sectional elevation.

The nipple shown in the drawing includes two end sections 1 and 2 which are threaded to receive couplings. Intermediate these end sections there is a section 3 in which a series of spaced grooves have been cut for the purpose of thinning the wall of the nipple so that it may be readily bent between its ends. The grooves may be a series of concentric coaxial grooves or the same effect may be obtained by cutting a single helical groove as in the illustrated nipple. The ultimate result is that the wall of the intermediate section of the nipple is thinned and there is formed a series of spaced rings 3a which reinforce the thin wall of the nipple against collapsing radially.

In connecting up pipe lines which are slightly offset, a nipple of this sort can be readily bent to join the offset sections of the pipe line and when so bent there are not any strains placed on the pipe connections. The nipple of course may be made of any suitable metal, the softer metals being preferable as these do not have any appreciable degree of resiliency and are less liable to have strains set up therein. The spaced reinforcing rings adequately protect the nipple against collapsing radially.

It is obvious that various changes may be made by those skilled in the art in the embodiment of my invention illustrated in the drawing and described in detail above within the principle and scope of the invention as expressed in the appended claims.

I claim:

1. A flexible pipe fitting adapted to be bent to connect offset sections of a pipe line comprising a tubular member having a section intermediate the ends thereof with a flexible wall thinner than the walls of the end sections, and reinforcing for the thin wall of the intermediate section to support the wall against collapsing when the fitting is bent.

2. A flexible pipe fitting adapted to be bent to connect offset sections of a pipe line comprising a tubular member having a section intermediate the ends thereof with a flexible wall thinner than the walls of the end sections, and a series of spaced reinforcing rings for the thin wall of the intermediate section to support the wall against collapsing when the fitting is bent.

3. A flexible pipe fitting adapted to be bent to connect offset sections of a pipe line comprising a tubular member having a section intermediate the ends thereof with a flexible wall thinner than the walls of the end sections, and a series of spaced integral reinforcing rings formed on the outer surface of the thin wall of the intermediate section for supporting the wall against collapsing when the fitting is bent.

HOWARD C. DAVIS.